United States Patent
Orita et al.

[11] Patent Number: 5,880,351
[45] Date of Patent: Mar. 9, 1999

[54] VIBRATION SENSING ELEMENT AND VIBRATION SENSOR

[75] Inventors: Koji Orita, Utsunomiya; Kazunori Yuze; Tsutomu Sugawara, both of Yokohama, all of Japan

[73] Assignees: Nihon Densi Kougaku Corporation, Tochigi; Nippon Aleph Corporation, Kanagawa, both of Japan

[21] Appl. No.: 900,531

[22] Filed: Jul. 25, 1997

[51] Int. Cl.⁶ ..................................................... G01P 21/00
[52] U.S. Cl. ........................... 73/1.82; 73/651; 200/61.51
[58] Field of Search .................................. 73/1.38, 1.39, 73/1.82, 651; 200/61.45 R, 61.45 M, 61.48, 61.49, 61.51

[56] References Cited

U.S. PATENT DOCUMENTS

| | | | |
|---|---|---|---|
| 3,422,311 | 1/1969 | Stanish | 73/651 |
| 4,028,615 | 6/1977 | Jansen et al. | 73/651 |
| 4,973,804 | 11/1990 | Cook et al. | 200/61.51 |
| 5,155,307 | 10/1992 | Breed et al. | 200/61.48 |

*Primary Examiner*—John E. Chapman
*Attorney, Agent, or Firm*—Pollock, Vande Sande & Amernick, R.L.L.P.

[57] ABSTRACT

A vibration sensing element includes a hermetically sealed case, a fixed electrode member made of a nonmagnetic electrically conductive material and fixed to the case with its tip portion projecting into the case, a movable electrode member made of an electrically conductive magnetic metal material exhibiting elasticity and fixed to the case with its tip portion projecting into the case and making pressure contact with the fixed electrode member, and a magnetic member disposed to face the movable electrode member. A glass breakage sensor includes a casing for attachment to the glass, the vibration sensing element, and a resin molding encasing the vibration sensing element. The contact pressure between the fixed and movable electrode members can be noninvasively checked by applying a magnetic field thereto.

28 Claims, 6 Drawing Sheets

VIBRATION SENSING ELEMENT AND VIBRATION SENSOR

BACKGROUND OF THE INVENTION

1. Field of the Invention

The present invention relates to a vibration sensing element and a vibration sensor using the vibration sensing element which are suitable for sensing mechanical vibration occurring in an object made of glass, metal or the like, particularly the characteristic mechanical vibration occurring when such an object breaks.

2. Prior Art

Vibration sensors for converting the characteristic mechanical vibration occurring upon the breakage of a glass plate, metal plate or the like into an electrical signal are widely used in, for example, security systems. As taught by Japanese Utility Model Publication No. Sho 62-39501, the vibration sensing element used in the prior-art vibration sensor of this type is a normally closed switch comprising a pair of conductive metal plate springs facing each other across a small distance with contacts at their tips touching lightly. This normally closed switch responds to vibration produced by breakage of the glass plate or the like (secured object) by repeatedly turning on and off (making and breaking) at high frequency. The normally closed switch is series-connected within a prescribed closed loop circuit for converting the vibration occurring when the secured object breaks into an electrical pulse signal with short-period level variation.

The conventional vibration sensor is equipped with such a vibration sensing element constituted as a normally closed switch having a pair of conductive metal plate springs touching at light contact pressure and is configured to utilize the electric signal produced by the vibration sensing element when it periodically turns on and off in response to vibration. Owing to this configuration, the sensor sensitivity to vibration can be increased only by lowering the contact pressure of the normally closed switch. When the contact pressure of the switch is reduced, however, the increase in the on-state resistance of the contacts owing to dirtying, oxidation, condensation, moisture and the like tends to be more pronounced. This degrades the operational reliability of the switch and makes it incapable of operating dependably over long periods.

This problem can be mitigated by hermetically sealing at least the contact portion of the normally closed switch. This has not been a practical solution, however, because with the conventional hermetically sealed contact configuration, measurement of the contact pressure of the normally closed switch is possible only before sealing of the switch contacts. After sealing of the contacts, measurement to determine whether the contact pressure is at the rated value cannot be made accurately from the exterior. This is extremely inconvenient from the point of quality control.

Moreover, the vibration sensor utilizing the vibration sensing element of this type is required to have high reliability and maintain its rated performance over a long period. The switch section therefore has to be tamperproof. The conventional practice has therefore been not to seal the switch contact portion but to adopt a sealed structure for the vibration sensor casing that houses the vibration sensing element and other components. Various techniques are used to make the casing difficult to force open. As a result, the prior-art vibration sensor has a complex structure and is expensive to manufacture.

SUMMARY OF THE INVENTION

One object of the invention is therefore to provide a hermetically sealed vibration sensing element which overcomes the aforesaid problems of the prior art.

Another object of the invention is to provide a hermetically sealed vibration sensing element whose switch section is housed in a hermetically sealed case which enables the contact pressure of the switch section for sensing vibration to be accurately measured from the outside.

Another object of the invention is to provide a hermetically sealed vibration sensing element whose contact pressure can be easily checked at the installation site or any other location.

Another object of the invention is to provide a hermetically sealed vibration sensing element whose structure facilitates hermetic sealing of the contact portion using glass.

Another object of the invention is to provide a vibration sensor using a hermetically sealed vibration sensing element and capable of overcoming the aforesaid problems of the prior art.

Another object of the invention is to provide a vibration sensor which, without use of a complex casing, can effectively prevent forcible opening and other types of tampering to ensure dependable operation over long periods even in harsh environments.

This invention provides a vibration sensing element for sensing vibration, the vibration sensing element comprising a hermetically sealed case, a fixed electrode member made of a nonmagnetic electrically conductive material and fixed to the hermetically sealed case to have a tip portion thereof project into an interior space of the hermetically sealed case, a movable electrode member made of an electrically conductive magnetic metal material exhibiting elasticity and fixed to the hermetically sealed case to have a tip portion thereof project into the interior space of the hermetically sealed case and make pressure contact with the fixed electrode member, and a magnetic member disposed to face the side of the movable electrode member opposite from that facing the fixed electrode member and to be spaced from the movable electrode member.

The movable electrode member can be imparted with frequency selectivity by matching its natural vibration frequency to the frequency of vibration occurring when a metal or the like breaks, thereby matching the sensitivity of the vibration sensing element to the characteristic mechanical vibration occurring upon breakage of an object made of glass, metal or the like. When configured in this manner, the sensing characteristics of the vibration sensing element are such that the vibration sensing element is unresponsive to vibration occurring when the object whose vibration is being sensed is simply hit by, for instance, a ball but is highly responsive to the vibration occurring when the object is broken.

The hermetically sealed case can be made of nonmagnetic metal or resin. It can also be made of glass. To protect the electrodes and the like sealed therein from oxidation, condensation of moisture thereon and other such problems, the interior space of the hermetically sealed case is preferably charged with an inert gas such as nitrogen gas or argon gas. Instead of charging the hermetically sealed case with such a special gas, however, the case can simply be hermetically sealed to isolate the contact portion of the switch constituted by the fixed electrode member and the movable electrode member from the surrounding environment. Alternatively, the purpose can be achieved simply by evacuating air from the interior space to, for example, a substantially vacuum state. It is also possible to charge the interior space of the hermetically sealed case with a mixture of an appropriate inert gas and hydrogen. This promotes radiation of heat from the contact portion. Making the hermetically sealed case of transparent or translucent glass enables the interior condition to be visually inspected from the exterior.

The contact pressure between the movable electrode member and the fixed electrode member can be set as appropriate for the intended use and purpose. Sensitivity increases with decreasing contact pressure and decreases with increasing contact pressure.

Since the movable electrode member and the magnetic member are both made of magnetic material, magnetic attraction arises between the movable electrode member and the magnetic member when a magnetic field is applied thereto from the exterior. Since the fixed electrode member is nonmagnetic, the applied magnetic field does not produce magnetic attraction between the movable electrode member and the fixed electrode member. By application of a magnetic field from the outside, therefore, the movable electrode member can be drawn away from the fixed electrode member against the spring force of the movable electrode member to bring it into contact with the magnetic member. The magnetic field can be produced, for example, by providing a coil on the outside of the hermetically sealed case and passing electric current through the coil. Since the current value when the movable electrode member separates from the fixed electrode member and contacts the magnetic member is closely related to the contact pressure between the movable electrode member and the fixed electrode member, the contact pressure is a specific function of the current value. By ascertaining this functional relationship beforehand, therefore, the contact pressure between the movable electrode member and the fixed electrode member in the vibration sensing element can be simply and accurately measured even in the hermetically sealed state after assembly.

The movable electrode member and the magnetic member are preferably made of a soft magnetic material such as a permalloy so that magnetization of these members made of magnetic material can be avoided to the highest degree possible.

When the vibration sensing element according to this aspect of the invention is not exposed to vibration from the outside, the tip portion of the movable electrode member is in pressure contact with the tip portion of the fixed electrode member, thereby maintaining electrical continuity between the movable electrode member and the fixed electrode member. When external vibration acts on the vibration sensing element, the movable electrode member vibrates in response to repeatedly make and break the electrical continuity between the movable electrode member and the fixed electrode member, thereby producing a periodic ON/OFF action.

When a magnetic field is applied from outside the hermetically sealed case, magnetic attraction proportional to the intensity of the magnetic field acts between the movable electrode member and the magnetic member. When this magnetic attraction exceeds the contact pressure, the tip portion of the movable electrode member separates from the fixed electrode member. Since the contact pressure is a specific function of the applied magnetic field intensity, the contact pressure can be determined from this relationship.

In accordance with another aspect of the invention, there is provided a vibration sensing element for sensing vibration, the vibration sensing element comprising a hermetically sealed case, a first electrode member made of an electrically conductive material and fixed to the hermetically sealed case to have a tip portion thereof project into an interior space of the hermetically sealed case, a fixed contact member made of an electrically conductive nonmagnetic metal material and fixed to the tip portion of the first electrode member, a second electrode member made of an electrically conductive magnetic metal material exhibiting elasticity and fixed to the hermetically sealed case to have a tip portion thereof project into the interior space of the hermetically sealed case and make pressure contact with the fixed contact member, and a magnetic member disposed to face the side of the second electrode member opposite from that facing the fixed contact member and to be spaced from the second electrode member.

The second electrode member can be imparted with frequency selectivity by matching its natural vibration frequency to the frequency of vibration occurring when a metal or the like breaks, thereby matching the sensitivity of the vibration sensing element to the characteristic mechanical vibration occurring upon breakage of an object made of glass, metal or the like. When configured in this manner, the sensing characteristics of the vibration sensing element are such that the vibration sensing element is unresponsive to vibration occurring when the object whose vibration is being sensed is simply hit by, for instance, a ball but is highly responsive to the vibration occurring when the object is broken.

The hermetically sealed case can be made of nonmagnetic metal or resin. It can also be made of glass. To protect the electrodes and the like sealed therein from oxidation, condensation of moisture thereon and other such problems, the interior space of the hermetically sealed case is preferably charged with an inert gas such as nitrogen gas or argon gas. Instead of charging the hermetically sealed case with such a special gas, however, the case can simply be hermetically sealed to isolate the contact portion of the switch constituted by the fixed contact member and the second electrode member from the surrounding environment. Alternatively, the purpose can be achieved simply by evacuating air from the interior space to, for example, a substantially vacuum state. It is also possible to charge the interior space of the hermetically sealed case with a mixture of an appropriate inert gas and hydrogen. This promotes radiation of heat from the contact portion.

The contact pressure between the second electrode member and the fixed contact member can be set as appropriate for the intended use and purpose. Sensitivity increases with decreasing contact pressure and decreases with increasing contact pressure.

Since the second electrode member and the magnetic member are both made of magnetic material, magnetic attraction arises between the second electrode member and the magnetic member when a magnetic field is applied thereto from the exterior. By this, the second electrode member can be drawn away from the fixed contact member against the spring force of the second electrode member to bring it into contact with the magnetic member. The magnetic field can be produced, for example, by providing a coil on the outside of the hermetically sealed case and passing electric current through the coil. Since the current value when the second electrode member separates from the fixed contact member and contacts the magnetic member is closely related to the contact pressure between the second electrode member and the fixed contact member, the contact pressure is a specific function of the current value. By ascertaining this functional relationship beforehand, therefore, the contact pressure between the second electrode member and the fixed contact member in the vibration sensing element can be simply and accurately measured even in the hermetically sealed state after assembly.

The second electrode member and the magnetic member are preferably made of a soft magnetic material such as a permalloy so that magnetization of these members made of magnetic material can be avoided to the highest degree possible. If the first electrode member is also made of a permalloy, the product yield in the heat treatment step for fixing the three members with respect to the case increases, particularly when the case is made of glass, because all three members have the same coefficient of thermal expansion. The merit of fixing the fixed contact member to the tip portion of the first electrode member is that it enables the first electrode member to be made of the same material as at least the second electrode member, which is preferable from the viewpoint of product yield as pointed out above, or the same material as both the second electrode member and the magnetic member, which is even more preferable. Specifically, it enables some or all of the members to have the same thermal expansion coefficient, thereby increasing the product yield in the heat treatment step particularly when a glass case is used. Nevertheless, the first electrode member can of course instead be made of an appropriate electrically conductive nonmagnetic material.

When the first electrode member is made of a permalloy, the fixed contact member fixed thereto can preferably be made of a nonmagnetic material such as phosphor bronze. This enables the two members to be bonded by spot welding, for example, thus ensuring reliable attachment of the fixed contact member to the tip portion of the first electrode member. Other material combinations are of course also usable.

When the vibration sensing element according to this aspect of the invention is not exposed to vibration from the outside, the tip portion of the second electrode member is in pressure contact with the fixed contact member, thereby maintaining electrical continuity between the first electrode member and the second electrode member. When external vibration acts on the vibration sensing element, the second electrode member vibrates in response to repeatedly make and break the electrical continuity between the first electrode member and the second electrode member, thereby producing a periodic ON/OFF action.

When a magnetic field is applied from outside the hermetically sealed case, magnetic attraction proportional to the intensity of the magnetic field acts between the second electrode member and the magnetic member. When this magnetic attraction exceeds the contact pressure, the tip portion of the second electrode member separates from the fixed contact member. Since the contact pressure is a specific function of the applied magnetic field intensity, the contact pressure can be determined from this relationship.

In accordance with another aspect of the invention, there is provided a vibration sensor for sensing vibration imparted to a glass plate or other object, the vibration sensor comprising a casing for attachment to the object, a vibration sensing element of one of the foregoing types, and a resin molding encasing the vibration sensing element.

Since the vibration sensing element provided in the casing of the vibration sensor according to this aspect of the invention is hermetically sealed, it can be encased in the resin molding without modification. The vibration sensing element encased in the resin molding is well protected from the surrounding environment and is also highly tamperproof. When the electrical connectors of the vibration sensor are also encased in the resin molding, they too are well protected.

This invention will be better understood and other objects and advantages thereof will be more apparent from the following detailed description of preferred embodiments with reference to the accompanying drawings.

DETAILED DESCRIPTION OF THE PREFERRED EMBODIMENTS

Figure 1:
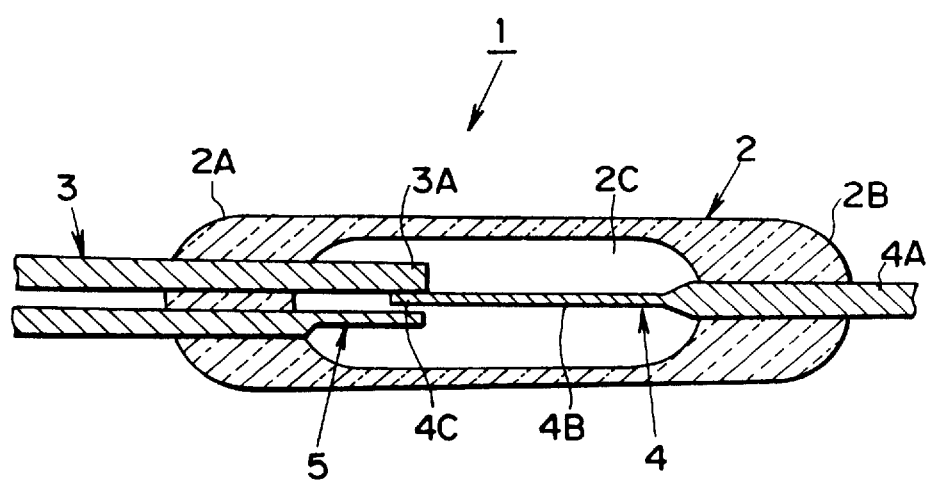
FIG. 1 is a cross sectional view showing a vibration sensing element which is an embodiment of the invention.

FIG. 1 is a cross sectional view showing a vibration sensing element 1 which is an embodiment of the invention. The vibration sensing element 1 has a tubular glass case 2 functioning as a hermetically sealed case. A fixed electrode 3 passes into the glass case 2 through one end portion 2A to be hermetically sealed and fixed thereby. The fixed electrode 3 is an elongate plate-like member formed of a nonmagnetic conductive material (phosphor bronze in this embodiment). The tip portion 3A of the fixed electrode 3 projects into the hollow interior of the glass case 2.

The tip portion 3A of the fixed electrode 3 is made sufficiently thick to be rigid enough not to vibrate within the glass case 2 when vibration acts thereon.

A movable electrode 4 passes into the glass case 2 through the other end portion 2B to be hermetically sealed and fixed thereby with its tip portion 4C normally in contact with the fixed electrode 3. The movable electrode 4 has an elongate plate-like shape as a whole and is formed of a material exhibiting magnetic and conductive properties, specifically a permalloy. It has a base portion 4A fixed to the other end portion 2B and a projecting portion 4B which extends from the base portion 4A into the glass case 2 and is made thinner than the base portion 4A so as to enhance its spring property (elasticity). The tip portion 4C of the projecting portion 4B is held in light contact with the fixed electrode 3 by the spring action of the projecting portion 4B. The glass case 2 is made of transparent glass to enable visual inspection of the interior condition from outside the glass case 2. The material of the glass case is not limited to transparent glass, however, and can be freely selected from among various types of glass materials. Moreover, the glass case 2 can be replaced with one made of any of various other appropriate transparent, translucent and opaque materials.

The movable electrode 4, specifically the projecting portion 4B thereof, is formed to have a natural vibration frequency in the approximate range of 1,000–1,500 Hz, which is the range in which the vibration produced by breaking glass and the like falls. When imparted with vibration in this range, therefore, the projecting portion 4B experiences large vibrational displacement to cause making and breaking of the contact between the tip portion 4C and the fixed electrode 3. The vibration sensing element 1 can therefore sense vibration in the desired frequency range, like the prior-art vibration sensing elements of this type.

The magnitude of the contact pressure between the movable electrode 4 and the fixed electrode 3 can be set to a value suitable for the intended use by, for example, appropriately adjusting the thickness, shape, camber etc. of the projecting portion 4B.

To enable checking of the contact pressure between the movable electrode 4 and the fixed electrode 3 from outside the glass case 2, a magnetic member 5 made of a magnetic material is provided to pass into the glass case 2 through the one end portion 2A so as to face the side of the movable electrode 4 opposite from that facing the fixed electrode 3 and be spaced a prescribed distance from the movable electrode 4. When the vibration sensing element 1 is exposed to a magnetic field from outside the glass case 2, as will be explained later, magnetic attraction arising between the movable electrode 4 and the magnetic member 5 overcomes the spring force of the movable electrode 4 and draws it away from the fixed electrode 3 into contact with the magnetic member 5. The magnetic member 5 also serves as a stop for preventing damage that might otherwise occur when the amplitude of the vibration of the movable electrode 4, particularly the projecting portion 4B thereof, becomes large at the time vibration acts on the vibration sensing element 1.

In this embodiment, the magnetic member 5 is formed of a permalloy, a soft magnetic material, as an elongate plate-like member similar in shape to the fixed electrode 3. It is fixed to and hermetically sealed by the one end portion 2A of the glass case 2 so as to lie approximately parallel to the fixed electrode 3 at a prescribed distance therefrom. The tip portion 5A of the magnetic member 5 projecting into the interior of the glass case 2 is thinned but retains enough rigidity to serve its stop function. Like the tip portion 3A of the fixed electrode 3, therefore, the tip portion 5A of the magnetic member 5 does not vibrate when vibration of a level occurring under normal use conditions acts on the vibration sensing element 1.

The fixed electrode 3 and the movable electrode 4 constitute an ON/OFF switch whose essential portion is located in the hermetically sealed space 2C defined by the glass case 2 and is thus protected from dust, corrosive gases, moisture and the like. Moreover, since the hermetically sealed space 2C is charged with argon, an inert gas, the contact portions formed by the tip portions of the fixed electrode 3 and the movable electrode 4 can be effectively protected against degradation by oxidation etc. over a long period of time. Alternatively, nitrogen or some other appropriate inert gas can be hermetically sealed in the space 2C instead of argon. Further, instead of charging the glass case 2 with such a special gas, the glass case 2 can simply be hermetically sealed or the hermetically sealed space 2C within the glass case 2 can be evacuated to a substantially vacuum state. Another possibility is to charge the hermetically sealed space 2C with a mixture of an inert gas and hydrogen. This provides enhanced protection against contact degradation and promotes radiation of heat. All of these arrangements ensure effective protection of the switch mechanism in the hermetically sealed space 2C against dust, oxidation, corrosive gases, moisture and the like.

Any nonmagnetic material exhibiting conductivity can be used for the fixed electrode 3 and any magnetic material exhibiting elasticity and conductivity can be used for the movable electrode 4. The material of the magnetic member 5 is only required to be magnetic and does not necessarily have to be conductive. When the magnetic member 5 is made of a conductive magnetic material such as a permalloy, however, a conductive path is established through the movable electrode 4 and the magnetic member 5 when the movable electrode 4 separates from the fixed electrode 3 and makes contact with the magnetic member 5. The establishment of this path can be used to detect the time at which the movable electrode 4 separates from the fixed electrode 3 (makes contact with the magnetic member 5). Otherwise, if the time of contact of the movable electrode 4 with the magnetic member 5 is ascertained visually or by the sound produced by the contact, the magnetic member 5 need not extend to the exterior of the glass case 2.

When external vibration acts on the vibration sensing element 1 configured according to this embodiment, the vibration is transmitted through the glass case 2 to the movable electrode 4 and also through the fixed electrode 3 to the movable electrode 4. The vibration this produces in the projecting portion 4B of the movable electrode 4 causes making and breaking of electrical contact between the movable electrode 4 and the fixed electrode 3. This enables application of the vibration sensing element 1 to, for example, a system for monitoring the security of a window pane. Specifically, the movable electrode 4 and the fixed electrode 3 are series-connected within a closed loop circuit of the system and the vibration sensing element 1 is attached by appropriate means to the pane to be monitored. Vibration occurring when the pane is broken is transmitted to the projecting portion 4B of the movable electrode 4, causing repeated making and breaking of electrical contact between the tip portion 4C of the movable electrode 4 and the fixed electrode 3. The system uses the electrical pulse signal this produces in the closed loop to discriminate breaking of the window pane.

As pointed out earlier, the projecting portion 4B of the movable electrode 4 is made to have a natural vibration frequency in the frequency range of vibration occurring when glass or the like breaks. When the vibration sensing element 1 is used as a sensor for sensing the breaking of glass, therefore, its frequency selectivity enables it to be unresponsive to relatively low-frequency vibration such as when the glass is hit with the hand but to be highly responsive to the vibration occurring when the glass is broken. It is therefore capable of distinguishing between and responding reliably to these situations.

As explained, the magnetic member 5 made of a magnetic material is disposed near the projecting portion 4B of the movable electrode 4 serving as the vibration sensing member. The contact pressure between the movable electrode 4 and the fixed electrode 3 can therefore be measured by applying a magnetic field from outside the glass case 2, gradually increasing the intensity of the magnetic field, and measuring the intensity of the magnetic field when the magnetic attraction acting between the movable electrode 4 and the magnetic member 5 causes the projecting portion 4B of the movable electrode 4 to separate from the fixed electrode 3 and contact the magnetic member 5.

This contact pressure measurement can be readily implemented by placing the vibration sensing element to be tested inside a prescribed solenoid coil, gradually increasing the DC current passed through the solenoid coil, and measuring the current value when the movable electrode 4 separates from the fixed electrode 3 and contacts the magnetic member 5. The measurement principle is as explained earlier.

The time at which the movable electrode 4 separates from the fixed electrode 3 and contacts the magnetic member 5 can be ascertained from the sound produced when the movable electrode 4 strikes on the magnetic member 5 owing to the magnetic attraction. Otherwise it can be electrically determined by detecting the time at which the electrically conductive state between the movable electrode 4 and the fixed electrode 3 is interrupted. In the latter case, the magnetic member 5 must be made of an electrically conductive material such as a permalloy.

Another method usable for measuring the contact pressure between the movable electrode 4 and the fixed electrode 3 is to bring a prescribed permanent magnet gradually closer to the vibration sensing element, note the distance between the permanent magnet and the vibration sensing element at the time the movable electrode 4 is magnetically attracted to the magnetic member 5 owing to the magnetic field of the permanent magnet, and determining the contact pressure from this distance.

Figure 2:
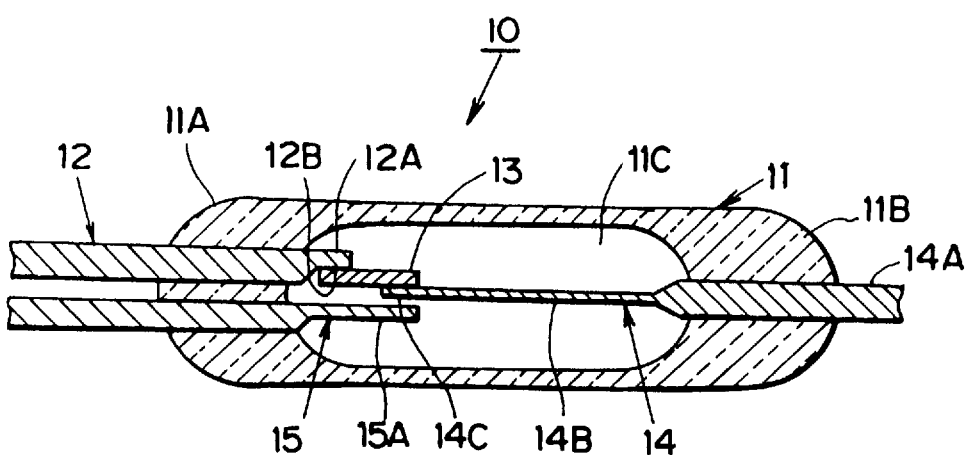
FIG. 2 is cross sectional view of a vibration sensing element which is another embodiment of the invention.

FIG. 2 is cross sectional view of a vibration sensing element 10 which is another embodiment of the invention. The vibration sensing element 10 has a tubular glass case 11 functioning as a hermetically sealed case. A first electrode 12 passes into the glass case 11 through one end portion 11A to be hermetically sealed and fixed thereby. The first electrode 12 is an elongate plate-like member formed of a permalloy, a conductive material. The tip portion 12A of the first electrode 12 projects into the hollow interior of the glass case 11. The tip portion 12A is formed with a step 12B and a plate-like fixed contact 13 made of phosphor bronze is fixed fast to the step 12B by spot welding.

The fixed contact 13 is a rectangular plate-like member made sufficiently thick to be rigid. The projecting length of tip portion 12A of the first electrode 12 is determined not to be especially long relative to the thickness thereof. This is to ensure that the tip portion 12A does not vibrate within the glass case 11 but has sufficient rigidity to solidly support the fixed contact 13. Since the fixed contact 13 is therefore supported by the tip portion 12A of the first electrode 12 so as not to vibrate within the glass case 11, the fixed contact 13 and the tip portion 12A of the first electrode 12 do not vibrate within the glass case 11 when vibration acts on the glass case 11.

A second electrode 14 passes into the glass case 11 through the other end portion 11B to be hermetically sealed and fixed thereby with its tip portion 14C normally in contact with the fixed contact 13 attached to the first electrode 12. The second electrode 14 has an elongate plate-like shape as a whole and is formed of a permalloy. It has a base portion 14A fixed to the other end portion 11B and a projecting portion 14B which extends from the base portion 14A into the glass case 11 and is made thinner than the base portion 14A so as to enhance its spring property. The tip portion 14C of the projecting portion 14B is held in light contact with the fixed contact 13 by the spring action of the projecting portion 14B.

The second electrode 14, specifically the projecting portion 14B thereof, is formed to have a natural vibration frequency in the approximate range of 1,000–1,500 Hz, which is the range in which the vibration produced by breaking glass and the like falls. When imparted with vibration in this range, therefore, the projecting portion 14B experiences large vibrational displacement to cause making and breaking of the contact between the tip portion 14C and the fixed contact 13. The vibration sensing element 10 can therefore sense vibration in the desired frequency range, like the prior-art vibration sensing elements of this type.

The magnitude of the contact pressure between the tip portion 14C and the fixed contact 13 can be set to a value suitable for the intended use by, for example, appropriately adjusting the thickness, shape, camber etc. of the projecting portion 14B. The tip portion 14C extends only as far as the tip portion of the fixed contact 13. A relatively large distance is therefore maintained between the tip portion 14C and the first electrode 12.

To enable checking of the contact pressure between the tip portion 14C of the second electrode 14 and the fixed contact 13 from outside the glass case 11, a magnetic member 15 made of a magnetic material is provided to pass into the glass case 11 through the one end portion 11A so as to face the side of the second electrode 14 opposite from that facing the fixed contact 13 and be spaced a prescribed distance from the tip portion 14C in contact with the fixed contact 13. As shown in FIG. 2, the prescribed distance established between tip portion 14C and the magnetic member 15 is made considerably smaller than the distance between the projecting portion 14B and the tip of first electrode 12. When a magnetic field is applied to the vibration sensing element from outside the glass case 11 as indicated later, therefore, the magnetic attraction acting between the first electrode 12 and the second electrode 14 is considerably smaller than the magnetic attraction arising between the second electrode 14 and the magnetic member 15. The movement of the second electrode 14 is therefore not impeded by the magnetic attraction arising between the second electrode 14 and the magnetic member 15. The magnetic member 15 also serves as a stop for preventing damage that might otherwise occur when the amplitude of the vibration of the second electrode 14, particularly the projecting portion 14B thereof, becomes large at the time vibration acts on the vibration sensing element 10.

In this embodiment, the magnetic member 15 is formed of a permalloy as an elongate plate-like member similar in shape to the first electrode 12. It is fixed to and hermetically sealed by the one end portion 11A of the glass case 11 so as to lie approximately parallel to the first electrode 12 at a prescribed distance therefrom. The tip portion 15A of the magnetic member 15 projecting into the interior of the glass case 11 is thinned but retains enough rigidity to serve its stop function. Like the tip portion 12A of the first electrode 12, therefore, the tip portion 15A of the magnetic member 15 does not vibrate when vibration of a level occurring under normal use conditions acts on the vibration sensing element 10.

The first electrode 12, the fixed contact 13 and the second electrode 14 constitute an ON/OFF switch whose essential portion is located in the hermetically sealed space 11C defined by the glass case 11 and is thus protected from dust, corrosive gases, moisture and the like. Moreover, since the hermetically sealed space 11C is charged with argon, an inert gas, the contact portions formed by the fixed contact 13 and the tip portion 14C can be effectively protected against degradation by oxidation etc. over a long period of time. Alternatively, nitrogen or some other appropriate inert gas can be hermetically sealed in the space 11C instead of argon. Further, instead of charging the glass case 11 with such a special gas, the glass case 11 can simply be hermetically sealed or the hermetically sealed space 11C within the glass case 11 can be evacuated to a substantially vacuum state. Another possibility is to charge the hermetically sealed space 11C with a mixture of an inert gas and hydrogen. This provides enhanced protection against contact degradation and promotes radiation of heat. All of these arrangements ensure effective protection of the switch mechanism in the hermetically sealed space 11C against dust, oxidation, corrosive gases, moisture and the like.

The material of the first electrode 12 is not particularly limited insofar as it exhibits conductivity and does not necessarily have to be a magnetic material. However, making the first electrode 12 of a material also exhibiting magnetic properties, particularly of the same conductive and magnetic material as that of the second electrode 14 and the magnetic member 15, e.g., a permalloy, provides a certain advantage. Specifically, the product yield in the step for fixing and hermetically sealing the first electrode 12, the second electrode 14 and the magnetic member 15 with respect to the glass case increases because all of these members have the same coefficient of thermal expansion. On the other hand, the second electrode 14 can be made of any material exhibiting elastic, conductive and magnetic properties, while the material of the magnetic member 15 is only required to be magnetic. When the magnetic member 15 is made of a material that is both magnetic and conductive such as a permalloy, however, a conductive path is established through the second electrode 14 and the magnetic member 15 when the second electrode 14 separates from the fixed contact 13 and makes contact with the magnetic member 15. The establishment of this path can be used to detect the time at which the second electrode 14 separates from the fixed contact 13 (makes contact with the magnetic member 15).

When external vibration acts on the vibration sensing element 10 configured according to this embodiment, the vibration is transmitted through the glass case 11 to the second electrode 14 and also through the first electrode 12 and the fixed contact 13 to the second electrode 14. The vibration this produces in the projecting portion 14B of the second electrode 14 causes making and breaking of electrical contact between the second electrode 14 and the fixed contact 13. This enables application of the vibration sensing element 10 to, for example, a system for monitoring the security of a window pane. Specifically, the first electrode 12 and the second electrode 14 are series-connected within a closed loop circuit of the system and the vibration sensing element 10 is attached by appropriate means to the pane to be monitored. Vibration occurring when the pane is broken is transmitted to the projecting portion 14B of the second electrode 14, causing repeated making and breaking of electrical contact between the tip portion 14C of the second electrode 14 and the fixed contact 13. The system uses the electrical pulse signal this produces in the closed loop to discriminate breaking of the window pane.

As pointed out earlier, the projecting portion 14B of the second electrode 14 is made to have a natural vibration frequency in the frequency range of vibration occurring when glass or the like breaks. When the vibration sensing element 10 is used as a sensor for sensing the breaking of glass, therefore, its frequency selectivity enables it to be unresponsive to relatively low-frequency vibration such as when the glass is hit with the hand but to be highly responsive to the vibration occurring when the glass is broken. It is therefore capable of distinguishing between and responding reliably to these situations.

The magnetic member 15 made of a magnetic material is disposed near the projecting portion 14B of the second electrode 14 serving as the vibration sensing member. The contact pressure between the second electrode 14 and the fixed contact 13 can therefore be measured by applying a magnetic field from outside the glass case 11, gradually increasing the intensity of the magnetic field, and measuring the intensity of the magnetic field when the magnetic attraction acting between the second electrode 14 and the magnetic member 15 causes the projecting portion 14B of the second electrode 14 to separate from the fixed contact 13 and contact the magnetic member 15.

This contact pressure measurement can be readily implemented by placing the vibration sensing element to be tested inside a prescribed solenoid coil, gradually increasing the DC current passed through the solenoid coil, and measuring the current value when the second electrode 14 separates from the fixed contact 13 and contacts the magnetic member 15. The measurement principle is as explained earlier.

The time at which the second electrode 14 separates from the fixed contact 13 and contacts the magnetic member 15 can be ascertained visually or from the sound produced when the second electrode 14 strikes on the magnetic member 15 owing to the magnetic attraction. Otherwise it can be electrically determined by detecting the time at which the electrically conductive state between the first electrode 12 and the second electrode 14 is interrupted. Alternatively, if the magnetic member 15 is made of an electrically conductive material such as a permalloy, it can be electrically determined by detecting the time at which an electrically conductive state is established between the magnetic member 15 and the second electrode 14. When the contact of the second electrode 14 with the magnetic member 15 owing to the magnetic attraction is ascertained visually or by sound, the magnetic member 15 need not extend to the exterior of the glass case 11.

Another method usable for measuring the contact pressure between the second electrode 14 and the fixed contact 13 is to bring a prescribed permanent magnet gradually closer to the vibration sensing element, note the distance between the permanent magnet and the vibration sensing element at the time the second electrode 14 is magnetically attracted to the magnetic member 15 owing to the magnetic field of the permanent magnet, and determining the contact pressure from this distance.

Figure 3:
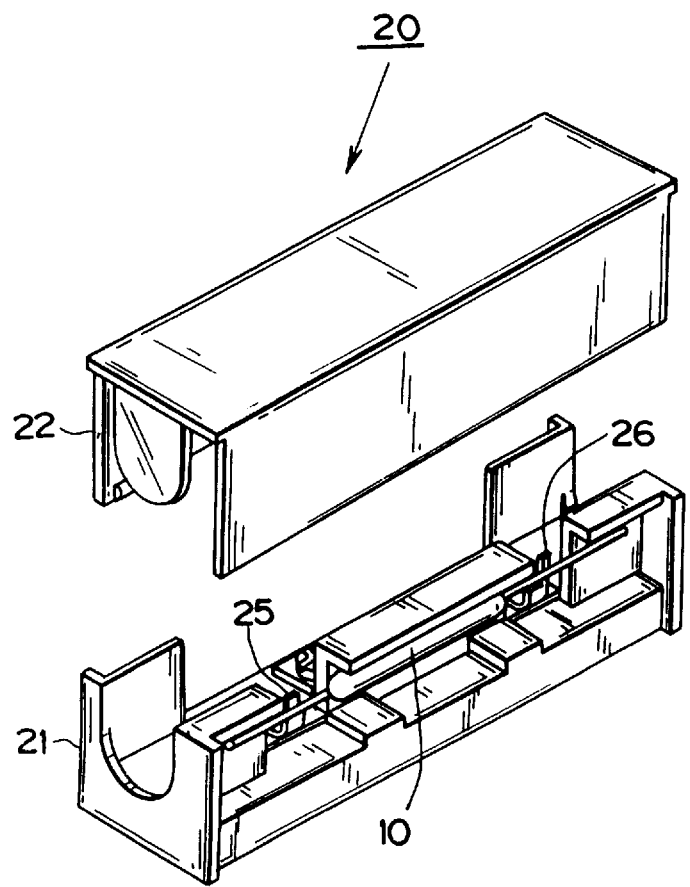
FIG. 3 is a perspective view showing an example of the structure of a glass breakage sensor using a vibration sensing element according to the invention.
Figure 4:
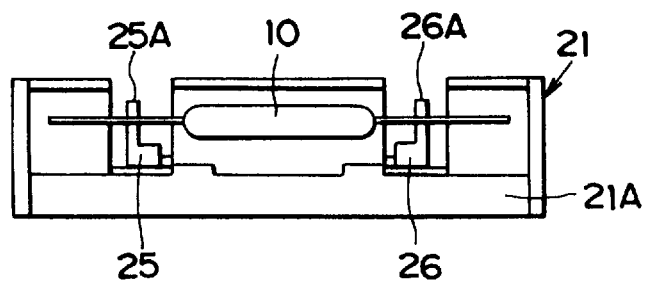
FIG. 4 is a front view of the main unit of the glass breakage sensor shown in FIG. 3.
Figure 5:
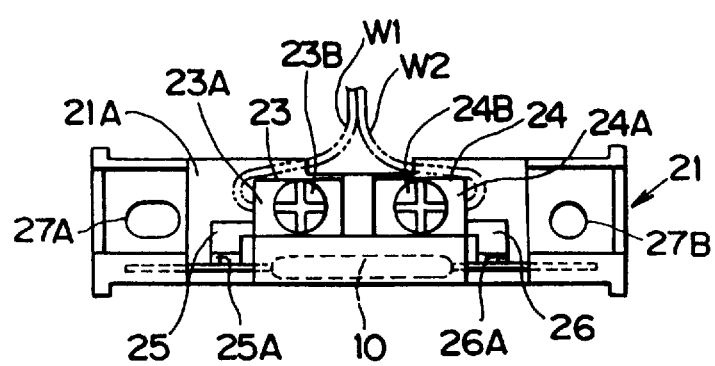
FIG. 5 is a plan view of the main unit of the glass breakage sensor shown in FIG. 3.

FIGS. 3 to 5 show an example of the structure of a glass breakage sensor 20 using the vibration sensing element 10 shown in FIG. 2. The glass breakage sensor 20 has a casing 21 and an associated cover 22 both made of an electrical insulating material, namely, synthetic resin. The casing 21 is provided with a pair of connection terminals 23, 24. L-terminals 25, 26 are provided in association with the connection terminals 23, 24, respectively (see FIG. 4).

The connection terminal 23 is of a well-known configuration comprising a conductive plate member 23A and a screw 23B for fastening it to the casing 21. The L-terminal 25 is fastened to the casing 21 by appropriate means and an end portion thereof (not shown) is electrically connected to the plate member 23A. The other connection terminal 24 is of the same well-known configuration comprising a conductive plate member 24A and a screw 24B for fastening it to the casing 21. The L-terminal 26 is fastened to the casing 21 by appropriate means and an end portion thereof (not shown) is electrically connected to the plate member 24A.

The connector portions 25A, 26A of the L-terminals 25, 26 rise vertically from the base 21A of the casing 21. The first electrode 12 of the vibration sensing element 10 is electrically and mechanically connected with the connector portion 25A by spot welding. The second electrode 14 thereof is similarly electrically and mechanically connected to the connector portion 26A by spot welding. In this embodiment, unlike what is shown in FIG. 2, the magnetic member 15 does not extend to the exterior of the glass case 11.

A connection wire W1 can be electrically connected with the first electrode 12 of the vibration sensing element 10 by inserting the tip thereof between the plate member 23A of the connection terminal 23 and the casing 21 and tightening the screw 23B. A connection wire W2 can similarly be electrically connected with the second electrode 14 of the vibration sensing element 10 by inserting the tip thereof between the plate member 24A of the connection terminal 24 and the casing 21 and tightening the screw 24B.

The glass breakage sensor 20 can be attached to an appropriate portion of a window pane by, for example, epoxy adhesive agent applied to the undersurface of the casing 21. This enables vibration occurring in the pane to be efficiently transmitted to the vibration sensing element 10. The casing 21 in particular is therefore preferably made of hard synthetic resin to ensure optimum vibration transmission.

The glass breakage sensor 20 can also be used for other purposes than sensing the breaking of glass. Depending on the object whose security is to be monitored, therefore, attachment can be achieved by use of fastening screw holes 27A, 27B provided in the base 21A of the casing 21 (see FIG. 5). The foregoing explanation made based on FIGS. 3 to 5 also applies without modification when the vibration sensing element 1 of FIG. 1 is used in place of the vibration sensing element 10.

Figure 6:
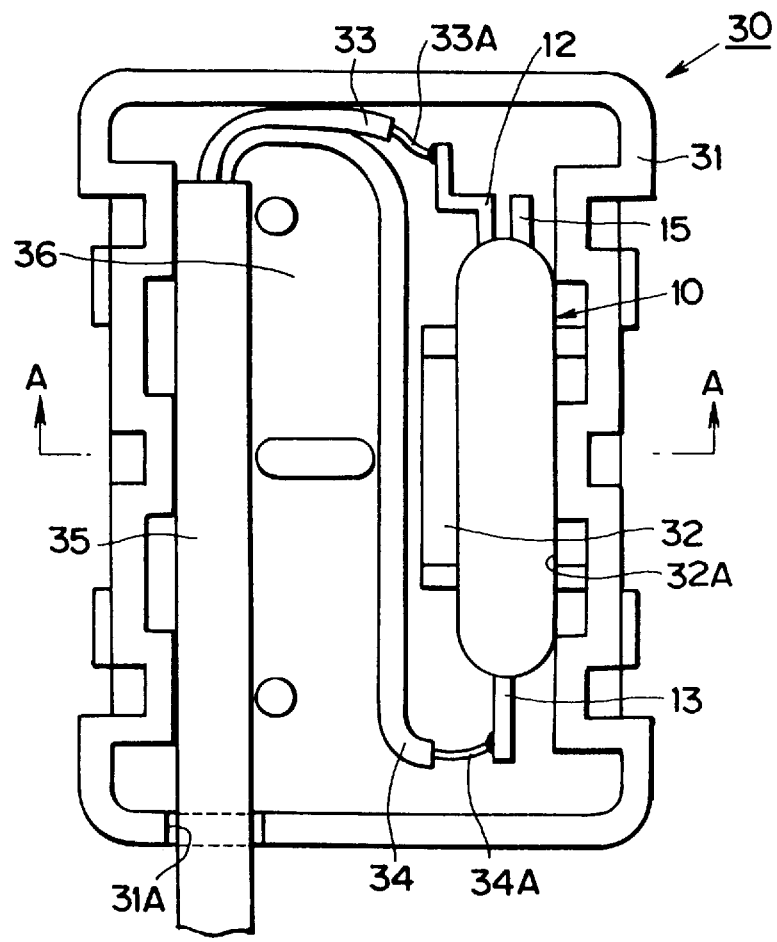
FIG. 6 is a plan view showing a vibration sensor which is an embodiment of this invention.
Figure 7:
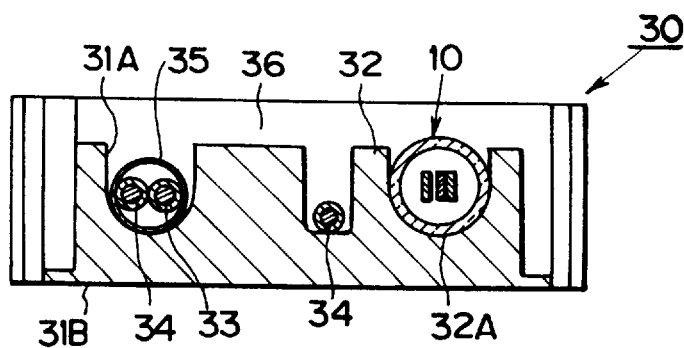
FIG. 7 is a sectional view taken along line A—A in FIG. 6.

FIGS. 6 and 7 show another embodiment of the invention vibration sensor using the vibration sensing element 10 of FIG. 2, specifically a glass breakage sensor 30. The glass breakage sensor 30 has a rectangular casing 31 made of an electrical insulating material, namely, synthetic resin. A housing portion 32 for accommodating the vibration sensing element 10 shown in FIG. 2 is formed in the casing 31 integrally therewith. The vibration sensing element 10 is mounted in a U-shaped groove 32A formed in the housing portion 32. The casing 31 is preferably made of hard synthetic resin to ensure optimum vibration transmission.

One ends 33A, 34A of lead lines 33, 34 are electrically connected to the first electrode 12 and the second electrode 14, respectively, of the vibration sensing element 10. The lead lines 33, 34 are enclosed in an insulating tube 35 and in this state are led to the exterior through a cutout portion 31A of the casing 31 as shown in FIG. 6.

The vibration sensing element 10, lead lines 33, 34 and insulating tube 35 are fixed in the casing 31 in the state illustrated in FIG. 6. For this, the interior of the casing 31 is charged with an appropriate resin so as to encase the vibration sensing element 10 and lead lines 33, 34 in a resin molding within the casing 31. Since the vibration sensing element 10 is hermetically sealed, the resin molding can be conducted with utmost ease. Reference numeral 36 in FIGS. 6 and 7 indicates the resin charged for forming the resin molding after curing. A cover (not shown) is attached to the casing 31 having the vibration sensing element 10 encased in the resin molding in this manner, thereby further physically protecting the components housed in the casing 31.

The glass breakage sensor 30 can be attached to an appropriate portion of a glass plate by, for example, epoxy adhesive agent applied to the undersurface 31B of the casing 31. This enables vibration occurring in the glass to be effectively transmitted through the casing 31 to the vibration sensing element 10 physically integrated with the casing 31 by the resin molding. The resin molding is therefore made of a resin material capable of transmitting vibration with good efficiency after curing. Preferable materials include such hard synthetic resin materials as epoxy resin, urethane resin, silicone resin and the like.

The foregoing explanation made based on FIGS. 6 and 7 also applies without modification when the vibration sensing element 1 of FIG. 1 is used in place of the vibration sensing element 10.

Figure 8:
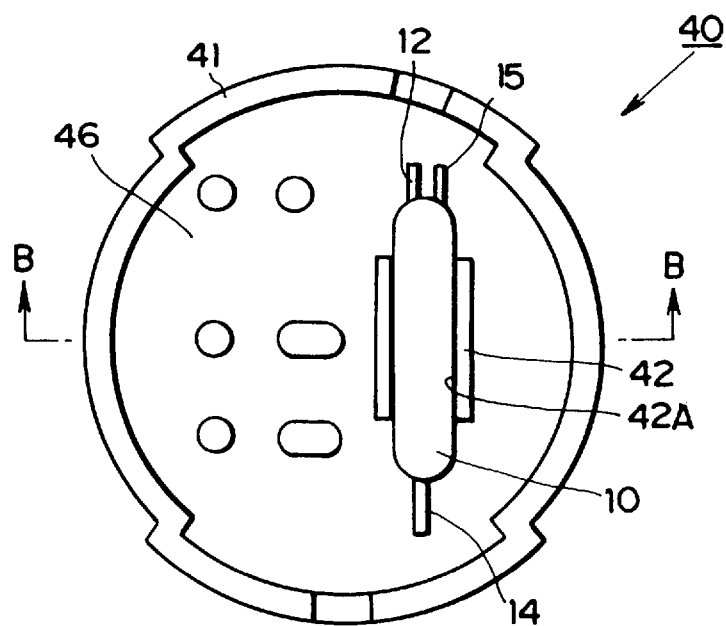
FIG. 8 is a plan view showing a vibration sensor which is another embodiment of the invention.
Figure 9:
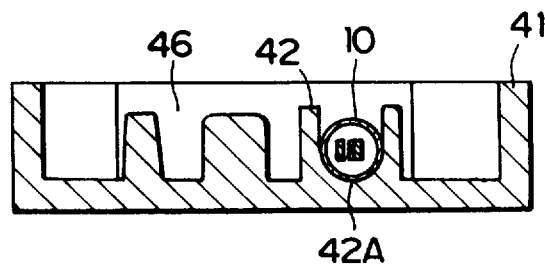
FIG. 9 is a sectional view taken along line B—B in FIG. 8.

FIGS. 8 and 9 show a vibration sensor 40 which is another embodiment of the invention. The vibration sensor 40 shown in FIGS. 8 and 9 has an approximately circular casing 41 made of the same type of material as that of the casing 31 shown in FIGS. 6 and 7. A housing portion 42 for accommodating the vibration sensing element 10 shown in FIG. 2 is formed in the casing 41 integrally therewith. The vibration sensing element 10 is mounted in a U-shaped groove 42A formed in the housing portion 42.

Although not shown in FIGS. 8 and 9, lead lines are connected to the first electrode 12 and the second electrode 14 of the vibration sensing element 10 and led outside the casing 41 in the same manner as in the embodiment shown in FIG. 6.

The vibration sensing element 10 mounted in the casing 41 in the foregoing manner is fixed therein by charging an appropriate resin into the casing 41 so as to encase it in a resin molding in a manner similar to that in the case of the glass breakage sensor 30. Reference numeral 46 in FIGS. 8 and 9 indicates the resin charged for forming the resin molding after curing.

The foregoing explanation made based on FIGS. 8 and 9 also applies without modification when the vibration sensing element 1 of FIG. 1 is used in place of the vibration sensing element 10.

Two embodiments of the invention vibration sensor having the vibration sensing element encased in a resin molding within a casing have been explained. In either embodiment, so as to ensure efficient transmission of vibration occurring in the glass (object whose security is being monitored) through the casing 31 or 41 to the vibration sensing element 10 (or vibration sensing element 1), the resin material for the resin molding is preferably one with high hardness after curing. Such synthetic resin materials include, for example, epoxy resin, urethane resin, silicone resin and the like. The ability of the configurations having the resin moldings to pick up vibrations from a glass plate or the like is greatly superior to that of the configurations in which the vibration sensing element is merely soldered to terminals or the like within the casing. The same is true when the object whose security is being monitored is made of a material other than glass.

Since the vibration sensing element 10 (vibration sensing element 1) is hermetically sealed, change in the characteristics of the vibration sensing element owing to external factors is effectively prevented and embedding of the vibration sensing element in a resin molding within the casing can be readily implemented. In the aforesaid embodiments comprising the resin molding, since the essential components of the vibration sensor are isolated from surrounding conditions, resistance to corrosion, water and moisture condensation, particularly that of the electrical connections, is enhanced and the components are effectively protected against the action of exterior forces. Since incorporation of the resin molding also makes the vibration sensor very difficult to alter, it very effectively prevents tampering with the vibration sensor after it has been attached to a window pane or the like. This configuration therefore enables the vibration sensor to operate dependably without experiencing degradation of the electrical connections or other such problems even when used for over a long period in a harsh environment and further effectively prevents unauthorized alteration after installation.

The vibration sensing element according this invention can be used not only for sensing vibration occurring in a glass plate but also for sensing vibration occurring in various other objects and materials, including, for example, vibration occurring in the metal plate material of a safe. Reliable sensing of the type of vibration concerned in such various applications can be ensured by adjusting the natural vibration frequency of the projecting portion 14B of the second electrode 14 (projecting portion 4B of the movable electrode 4) to that appropriate for the object whose vibration is to be sensed.

By enclosing the electrical contacts that turn on and off in response to vibration in a hermetically sealed case, this invention enables the vibration sensing element to operate stably over a long period in a harsh environment. In addition, since the contact pressure of the electrical contacts can be simply and accurately measured from the outside while maintaining the hermetically sealed state, the contact pressure and other properties of vibration sensing elements coming off the production line can be conducted quickly and accurately to ensure improved quality control. Other merits of the invention vibration sensing element include that its function can be simply and noninvasively checked at the installation site, greatly facilitating inspection and maintenance, and that it is highly amenable to encasement in a resin molding.

When the hermetically sealed vibration sensing element is encased in a resin molding within a casing, the essential portion of the vibration sensor can be isolated from the surrounding environment. By encasing the electrical connections in the resin molding together with the vibration sensing element, therefore, the resistance of the electrical connections to corrosion, water and moisture condensation can be enhanced. Another advantage of the resin molding encasement configuration is that it provides effective protection of the different components from the action of external forces. This configuration also makes unauthorized alteration of the vibration sensor extremely difficult and therefore is highly effective in making it tamperproof after installation on a window pane or other object whose security is to be monitored. This configuration therefore enables the vibration sensor to operate dependably without experiencing degradation of the electrical connections or other such problems even when used for over a long period in a harsh environment and further effectively prevents unauthorized alteration after installation.

What is claimed is:

1. A vibration sensing element for sensing vibration, the vibration sensing element comprising
   a hermetically sealed case,
   a fixed electrode member made of a nonmagnetic electrically conductive material and fixed to the hermetically sealed case to have a tip portion thereof project into an interior space of the hermetically sealed case,
   a movable electrode member made of an electrically conductive magnetic metal material exhibiting elasticity and fixed to the hermetically sealed case to have a tip portion thereof project into the interior space of the hermetically sealed case and make pressure contact with the fixed electrode member, and
   a magnetic member disposed to face a side of the movable electrode member opposite from that facing the fixed electrode member and to be spaced from the movable electrode member.

2. A vibration sensing element as claimed in claim 1, wherein a natural vibration frequency of the movable electrode member is set in a frequency range of mechanical vibration occurring in an object whose vibration is to be sensed.

3. A vibration sensing element as claimed in claim 1, wherein the interior space of the hermetically sealed case is charged with an inert gas.

4. A vibration sensing element as claimed in claim 1, wherein the interior space of the hermetically sealed case is charged with a mixed gas of an inert gas and hydrogen gas.

5. A vibration sensing element as claimed in claim 1, wherein the movable electrode member is made of a soft magnetic material.

6. A vibration sensing element as claimed in claim 1, wherein the magnetic member is made of a soft magnetic material.

7. A vibration sensing element as claimed in claim 1, wherein the magnetic member is made of an electrically conductive material and a portion thereof extends to the exterior of the hermetically sealed case.

8. A vibration sensing element as claimed in claim 1, wherein the hermetically sealed case is made of transparent glass.

9. A vibration sensing element for sensing vibration, the vibration sensing element comprising
   a hermetically sealed case,
   a first electrode member made of an electrically conductive material and fixed to the hermetically sealed case to have a tip portion thereof project into an interior space of the hermetically sealed case,
   a fixed contact member made of an electrically conductive nonmagnetic metal material and fixed to the tip portion of the first electrode member,
   a second electrode member made of an electrically conductive magnetic metal material exhibiting elasticity and fixed to the hermetically sealed case to have a tip portion thereof project into the interior space of the hermetically sealed case and make pressure contact with the fixed contact member, and
   a magnetic member disposed to face the side of the second electrode member opposite from that facing the fixed contact member and to be spaced from the second electrode member.

10. A vibration sensing element as claimed in claim 9, wherein a natural vibration frequency of the second electrode member is set in a frequency range of mechanical vibration occurring in an object whose vibration is to be sensed.

11. A vibration sensing element as claimed in claim 9, wherein the interior space of the hermetically sealed case is charged with an inert gas.

12. A vibration sensing element as claimed in claim 9, wherein the interior space of the hermetically sealed case is charged with a mixed gas of an inert gas and hydrogen gas.

13. A vibration sensing element as claimed in claim 9, wherein the second electrode member is made of a soft magnetic material.

14. A vibration sensing element as claimed in claim 9, wherein the magnetic member is made of a soft magnetic material.

15. A vibration sensing element as claimed in claim 9, wherein the magnetic member is made of an electrically conductive material and a portion thereof extends to the exterior of the hermetically sealed case.

16. A vibration sensing element as claimed in claim 9, wherein the hermetically sealed case is made of transparent glass.

17. A vibration sensing element as claimed in claim 9, wherein the first electrode member, the second electrode member and the magnetic member are made of the same type of electrically conductive magnetic material.

18. A vibration sensing element as claimed in claim 17, wherein the hermetically sealed case is made of transparent glass.

19. A vibration sensing element as claimed in claim 17, wherein the electrically conductive magnetic material is a permalloy.

20. A vibration sensing element as claimed in claim 19, wherein the hermetically sealed case is made of transparent glass.

21. A vibration sensing element as claimed in claim 19, wherein the fixed contact member is made of phosphor bronze and is fixed to the first electrode member by spot welding.

22. A vibration sensing element as claimed in claim 19, wherein the first electrode member is made of a permalloy, the fixed contact member is made of phosphor bronze, and the fixed contact member is fixed to the first electrode member by spot welding.

23. A vibration sensor for sensing vibration imparted to an object, the vibration sensor comprising a casing for attachment to the object, a vibration sensing element provided in the casing, and a resin molding provided in the casing and encasing the vibration sensing element, the vibration sensing element including a hermetically sealed case, a fixed electrode member made of a nonmagnetic electrically conductive material and fixed to the hermetically sealed case to have a tip portion thereof project into an interior space of the hermetically sealed case, a movable electrode member made of an electrically conductive magnetic metal material exhibiting elasticity and fixed to the hermetically sealed case to have a tip portion thereof project into the interior space of the hermetically sealed case and make pressure contact with the fixed electrode member, and a magnetic member disposed to face a side of the movable electrode member opposite from that facing the fixed electrode member and to be spaced from the movable electrode member.

24. A vibration sensor as claimed in claim 23, wherein the resin molding is formed of a molding material exhibiting high hardness after curing.

25. A vibration sensor as claimed in claim 23, wherein the resin molding is formed of a molding material selected from the group consisting of epoxy resin, urethane resin and silicone resin.

26. A vibration sensor for sensing vibration imparted to an object, the vibration sensor comprising a casing for attachment to the object, a vibration sensing element provided in the casing, and a resin molding provided in the casing and encasing the vibration sensing element, the vibration sensing element including a hermetically sealed case, a first electrode member made of an electrically conductive material and fixed to the hermetically sealed case to have a tip portion thereof project into an interior space of the hermetically sealed case, a fixed contact member made of an electrically conductive nonmagnetic metal material and fixed to the tip portion of the first electrode member, a second electrode member made of an electrically conductive magnetic metal material exhibiting elasticity and fixed to the hermetically sealed case to have a tip portion thereof project into the interior space of the hermetically sealed case and make pressure contact with the fixed contact member, and a magnetic member disposed to face the side of the second electrode member opposite from that facing the fixed contact member and to be spaced from the second electrode member.

27. A vibration sensor as claimed in claim 26, wherein the resin molding is formed of a molding material exhibiting high hardness after curing.

28. A vibration sensor as claimed in claim 26, wherein the resin molding is formed of a molding material selected from the group consisting of epoxy resin, urethane resin and silicone resin.

* * * * *